United States Patent [19]

Shebanow et al.

[11] Patent Number: 5,745,726
[45] Date of Patent: Apr. 28, 1998

[54] METHOD AND APPARATUS FOR SELECTING THE OLDEST QUEUED INSTRUCTIONS WITHOUT DATA DEPENDENCIES

[75] Inventors: Michael C. Shebanow, Plano, Tex.; John Gmuender, San Jose, Calif.; Michael A. Simone, Sunnyvale, Calif.; John R. F. S. Szeto, Oakland, Calif.; Takumi Maruyama; Deforest W. Tovey, both of Los Gatos, Calif.

[73] Assignee: Fujitsu, Ltd, Kawasaki, Japan

[21] Appl. No.: 523,384

[22] Filed: Sep. 5, 1995

(Under 37 CFR 1.47)

Related U.S. Application Data

[63] Continuation of Ser. No. 397,891, Mar. 3, 1995, abandoned.

[51] Int. Cl.[6] ............................................ G06F 9/30
[52] U.S. Cl. ................................. 395/392; 395/390
[58] Field of Search ................................. 395/392, 390

[56] References Cited

U.S. PATENT DOCUMENTS

| | | |
|---|---|---|
| 4,992,938 | 2/1991 | Cocke et al. . |
| 5,150,470 | 9/1992 | Hicks et al. . |
| 5,404,470 | 4/1995 | Miyake . |
| 5,404,552 | 4/1995 | Ikenaga . |
| 5,522,052 | 5/1996 | Inoue et al. . |
| 5,625,837 | 4/1997 | Popescu et al. . |

FOREIGN PATENT DOCUMENTS 6019707   1/1994   Japan .

OTHER PUBLICATIONS

Sohi, "Instruction Issue Logic for High-Performance, Interruptible, Multiple Functional Unit, Pipelined Computers" IEEE Transactions on Computers, vol. 39, No. 3, Mar. 1990.

Val Popescu et al; "The Metaflow Architecture"; pp. 349-359 IEEE Jun. 1991, pp. 10-73.

"Scanning Techniques for Managing Processor Instruction Look-Ahead Controls", R. M. Meade, IBM Technical Disclosure Bulletin, vol. 30, No. 11, Apr. 1988, pp. 308-311.

"Multiprocessing Instruction Buffer", IBM Technical Disclosure Bulletin, vol. 8, No. 7, Dec. 1965, pp. 962-964.

"Hardware Extration of Low-Level Concurrency from Serial Instruction Streams", A. K. Uht and R. G. Wedig, Proceedings of the 1986 Int'l Conference on Parallel Processing, Aug. 19-22, 1986, pp. 729-736.

"Pre-Decoding Mechanism for Superscalar Architecture", K. Minagawa, M. Saito and T. Aikawa, IEEE Pacific Rim Conference on Communications, Computers and Signal Processing, May 9-10, 1991, pp. 21-24.

*Primary Examiner*—Krisna Lim
*Attorney, Agent, or Firm*—Fenwick & West LLP

[57] ABSTRACT

An instruction selector receives M instructions per clock cycle and stores N instructions in an instruction queue memory. An instruction queue generates a precedence matrix indicative of the age of the N instructions. A dependency checker determines the available registers for executing the instructions ready for execution.

An oldest-instruction selector selects the M oldest instructions responsive to the precedence matrix and the eligible queue entry signals. The instruction queue provides the M selected instructions to execution units for execution. Upon completing the instructions, the execution units provide register availability signals to the dependency checker to release the registers used for the instructions.

5 Claims, 11 Drawing Sheets

METHOD AND APPARATUS FOR SELECTING THE OLDEST QUEUED INSTRUCTIONS WITHOUT DATA DEPENDENCIES

RELATED APPLICATIONS

This application is a continuation of U.S. patent application Ser. No. 08/397,891 filed Mar. 3, 1995, having the same title and inventors as the present application, now abandoned.

The subject matter of this application is related to the subject matter of the following applications:

application Ser. No. 08/388,602 entitled "INSTRUCTION FLOW CONTROL CIRCUIT FOR SUPER-SCALER MICROPROCESSOR" filed on Feb. 14, 1995 by Takeshi Kitahara;

application Ser. No. 08/388,389 entitled "ADDRESSING METHOD FOR EXECUTING LOAD INSTRUCTIONS OUT OF ORDER WITH RESPECT TO STORE INSTRUCTIONS" filed on Feb. 14, 1995 by Michael A. Simone and Michael C. Shebanow;

application Ser. No. 08/388,606 entitled "METHOD AND APPARATUS FOR EFFICIENTLY WRITING RESULTS TO RENAMED REGISTERS" filed on Feb. 14, 1995 by DeForest W. Tovey, Michael C. Shebanow and John Gmuender;

application Ser. No. 08/388,364 entitled "METHOD AND APPARATUS FOR COORDINATING THE USE OF PHYSICAL REGISTERS IN A MICROPROCESSOR" filed on Feb. 14, 1995 by DeForest W. Tovey, Michael C. Shebanow and John Gmuender;

application Ser. No. 08/390,885 entitled "PROCESSOR STRUCTURE AND METHOD FOR TRACKING INSTRUCTION STATUS TO MAINTAIN PRECISE STATE" filed on Feb. 14, 1995 by Gene W. Shen, John Szeto, Niteen A. Patkar and Michael C. Shebanow;

application Ser. No. 08/772,834, filed Dec. 24, 1996, which is a continuation of the application entitled "PARALLEL ACCESS MICRO-TLB TO SPEED UP ADDRESS TRANSLATION" filed on Mar. 3, 1995 by Chih-Wei David Chang, Kioumars Dawallu, Joel F. Boney, Ming-Ying Li and Jen-Hong Charles Chen;

application Ser. No. 08/464,152, filed Jun. 6, 1995, which is a continuation of the application entitled "LOOKASIDE BUFFER FOR ADDRESS TRANSLATION IN A COMPUTER SYSTEM" filed on Mar. 3, 1995 by Leon Kuo-Liang Peng, Yolin Lih and Chih-Wei David Chang;

application Ser. No. 08/397,893 entitled "RECLAMATION OF PROCESSOR RESOURCES IN A DATA PROCESSOR" filed on Mar. 3, 1995 by Michael C. Shebanow, Gene W. Shen, Ravi Swami, Niteen Patkar;

application Ser. No. 08/397,911 entitled "HARDWARE SUPPORT FOR FAST CONTROL SOFTWARE EMULATION OF UNIMPLEMENTED INSTRUCTIONS" filed on Mar. 3, 1995 by Shalesh Thusoo, Farnad Sajjadian, Jaspal Kohli, and Niteen Patkar;

application Ser. No. 08/398,284 entitled "METHOD AND APPARATUS FOR ACCELERATING CONTROL TRANSFER RETURNS" filed on Mar. 3, 1995 by Akiro Katsuno, Sunil Savkar and Michael C. Shebanow;

application Ser. No. 08/398,060 entitled "METHODS FOR UPDATING FETCH PROGRAM COUNTER" filed on Mar. 3, 1995 by Akira Katsuno, Niteen A. Patkar, Sunil Savkar and Michael C. Shebanow;

application Ser. No. 08/398,151 entitled "METHOD AND APPARATUS FOR RAPID EXECUTION OF CONTROL TRANSFER INSTRUCTIONS" filed on Mar. 3, 1995 by Sunil Savkar;

application Ser. No. 08/397,910 entitled "METHOD AND APPARATUS FOR PRIORITIZING AND HANDLING ERRORS IN A COMPUTER SYSTEM" filed on Mar. 3, 1995 by Chih-Wei David Chang, Joel Fredrick Boney and Jaspal Kohli;

application Ser. No. 08/397,800 entitled "METHOD AND APPARATUS FOR GENERATING A ZERO BIT STATUS FLAG IN A MICROPROCESSOR" filed on Mar. 3, 1995 by Michael Simone; and application Ser. No. 08/397,912 entitled "ECC PROTECTED MEMORY ORGANIZATION WITH PIPELINED READ-MODIFY-WRITE ACCESS" filed on Mar. 3, 1995 by Chien Chen and Yizhi Lu;

each of the above applications having the same assignee as the present invention, and each incorporated herein by reference in their entirety.

FIELD OF THE INVENTION

The invention relates to selecting program instructions from ones ready to execute, and more particularly to selecting program instructions based on data-dependency between instructions.

BACKGROUND OF THE INVENTION

High performance central processing units (CPU) use out-of-order execution of program instructions based on the local data dependency between instructions, because data-dependency between instructions stalls pipelines and degrades performance without out-of-order execution. For out-of-order execution, the CPU must decide how to select instructions to be executed from instructions ready to execute in an N-entry instruction queue.

SUMMARY OF THE INVENTION

In the present invention, an instruction receives M instructions at a time and stores N instructions. A precedence matrix is stored in a plurality of latches for indicating the order of the instructions. A dependency checker generates at least one eligible queue entry signal indicative of the instructions that are available for execution based on the availability of the required registers. In one embodiment, two eligible queue entry signals are generated indicative of available registers on the previous clock cycle and on the current clock cycle. An oldest-instruction selector selects the M oldest instructions responsive to the precedence matrix and the eligible queue entry signal.

DETAILED DESCRIPTION

Figure 1:
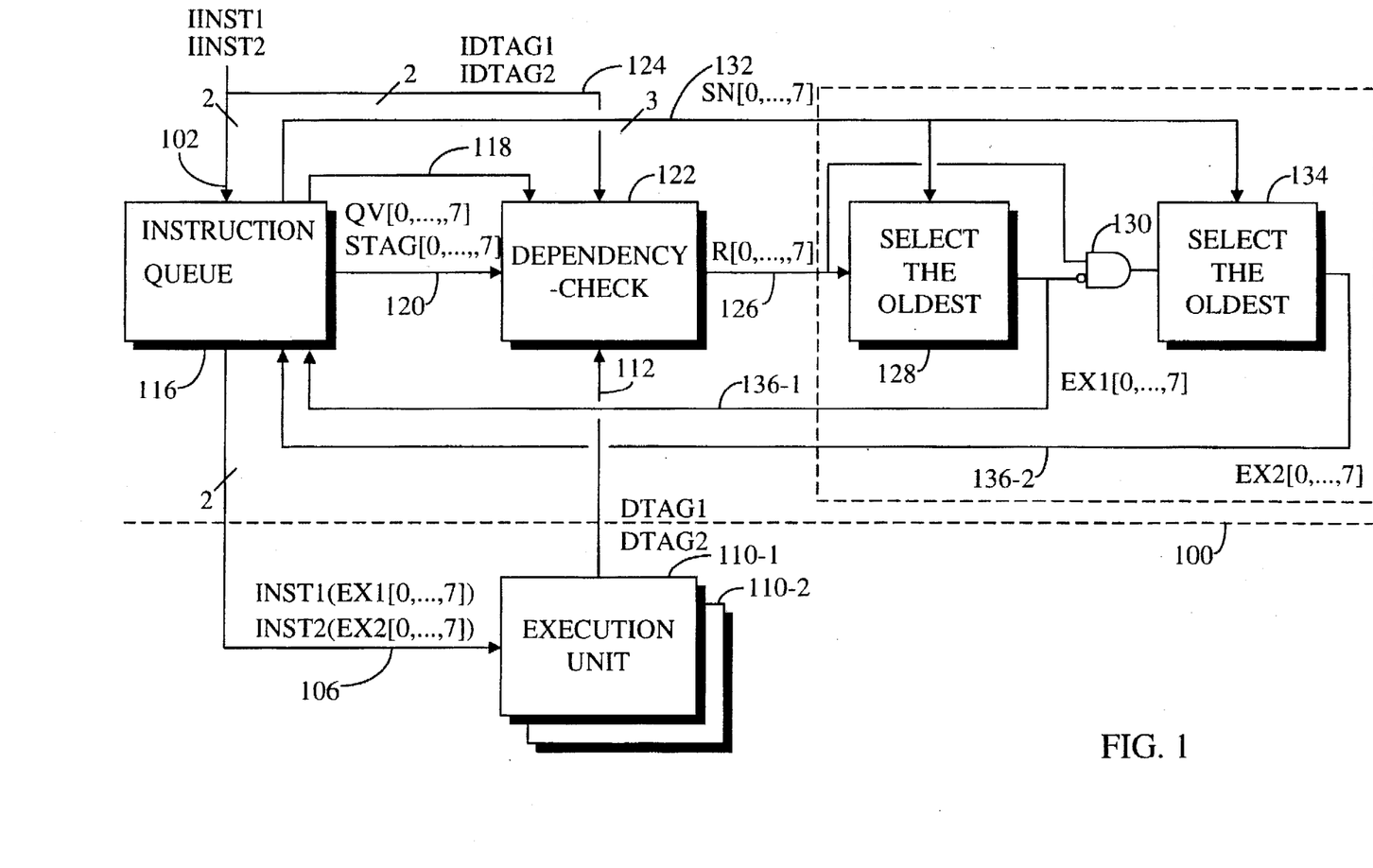
FIG. 1 is a block diagram illustrating an instruction selector.

Referring to FIG. 1, there is shown a block diagram illustrating an instruction selector 100. The instruction selector 100 receives program instructions 102-1, -2 in program order and destination register signals 124-1, -2 (IDTAG1, IDTAG2) indicative of the number of an external destination registers (not shown) of the dispatched instructions. The instruction selector 100 provides selected instructions 106-1, -2 to execution units 110-1, -2 for execution thereof. For purposes of illustration, the size of the instruction queue is 8 and the number of instructions to be selected is 2. Upon completing the execution, the execution units 110 provides destination register signals 112-1, -2 indicative of the number of the external destination register of the selected instructions 106-1, -2, respectively, to the instruction selector 100 for updating release information indicating that the destination register has become available for another instruction.

An instruction queue 116 receives the program instructions 102 in program order and stores the instructions therein. The instruction queue 116 provides a valid queue entries signal 118 (QV[0, . . . ,7]) indicative of the entries of the queue that contain instructions and a source register signal 120 (STAG[0, . . . ,7] corresponding to each instruction 102 and indicative of the source register numbers of the instructions in the instruction queue 116 to a dependency checker 122. For purposes of illustration, the number of registers is 8. The dependency checker 122 receives the destination register signals 124 (IDTAG1, IDTAG2) and determines whether the source register is available and provides an eligible queue entry signal 126 (R[0, . . . ,7]) to an oldest instruction selector 128 and to a deselection AND gate 130. Bits of the eligible queue entry signal 126 are set to indicate that a corresponding instruction in the queue is eligible for execution. The eligible queue entry signal 126 is a multi-hot vector, i.e. more than one bit of the vector may be set. The source register is available if the source register contains the recent result.

The instruction queue 116 provides an instruction age signal 132 (SN[0, . . . ,7]) corresponding to each instruction and indicative of the program order of the instructions in the queue to the first oldest-instruction selector 128 and to a second-oldest-instruction selector circuit 134. The instruction age signal 132 may be, for example, a sequence number with lower numbers indicating older instructions. The first oldest-instruction selector 128 provides an oldest-instruction vector 136-1 (EX1(0, . . . ,7]) to the instruction queue circuit 116 and to an inverted input of the deselection AND gate 130 and provides the logic AND of the inverted vector 136-1 and the eligible queue entry signal 126 to the second-oldest-instruction selector 134. The second-oldest-instruction selector 134 provides a 1-hot second-oldest-instruction vector 136-2 (EX2[0, . . . ,7]) to the instruction queue 116. The instruction vectors 136 are 1-hot vectors, i.e. at most one bit may be set. In response to the instruction vectors 136, the instruction queue 116 provides the corresponding selected instructions 106 (INST1[EX1], INST2[EX2]) to the corresponding execution unit 110 which, upon completing the execution, provides the destination register signals 112 to the dependency checker 122 for updating the release information to indicate that the destination register has become available for another instruction.

Figure 2A:
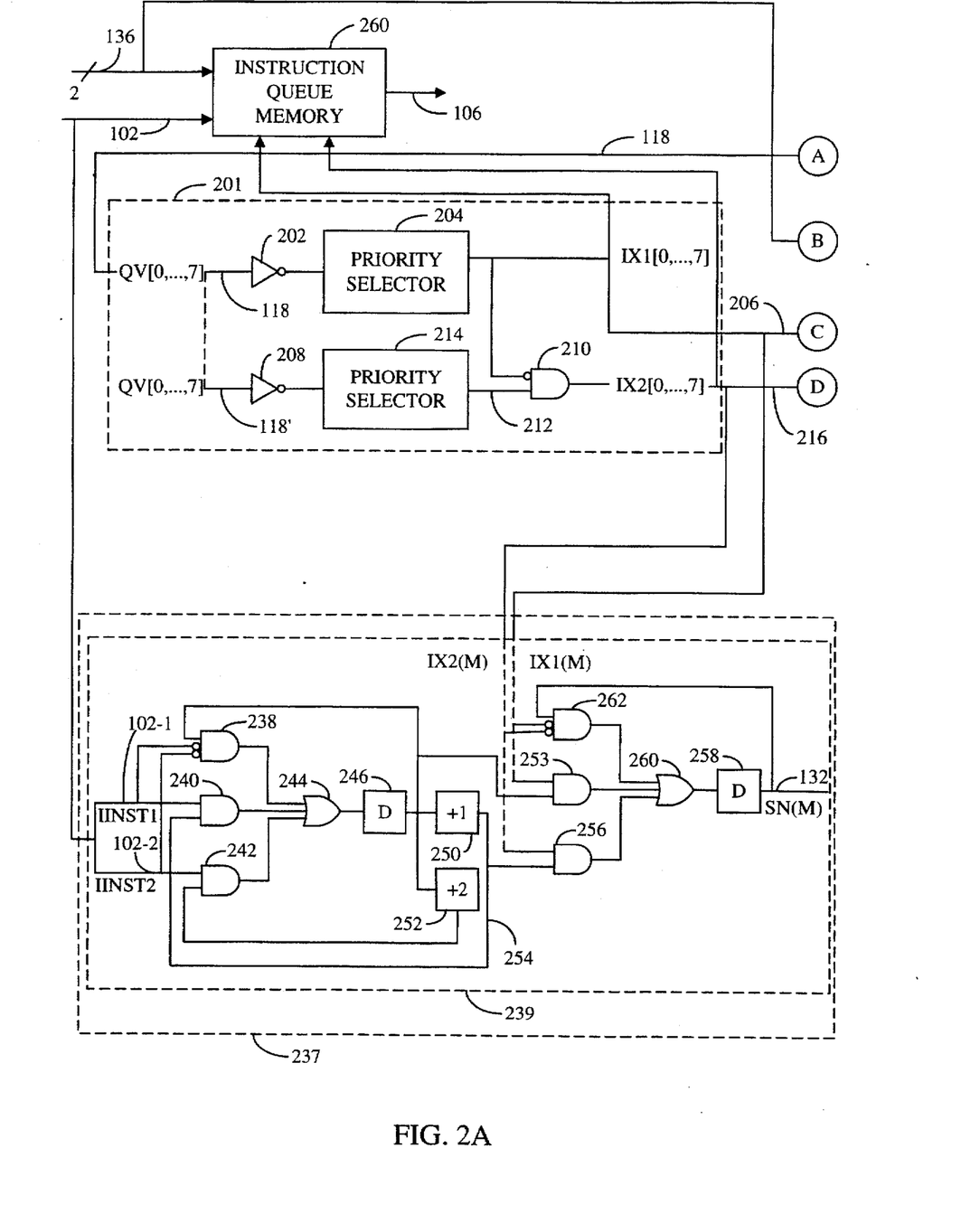
FIGS. 2a and 2b are block diagrams illustrating an instruction queue of the instruction selector of FIG. 1.
Figure 2B:
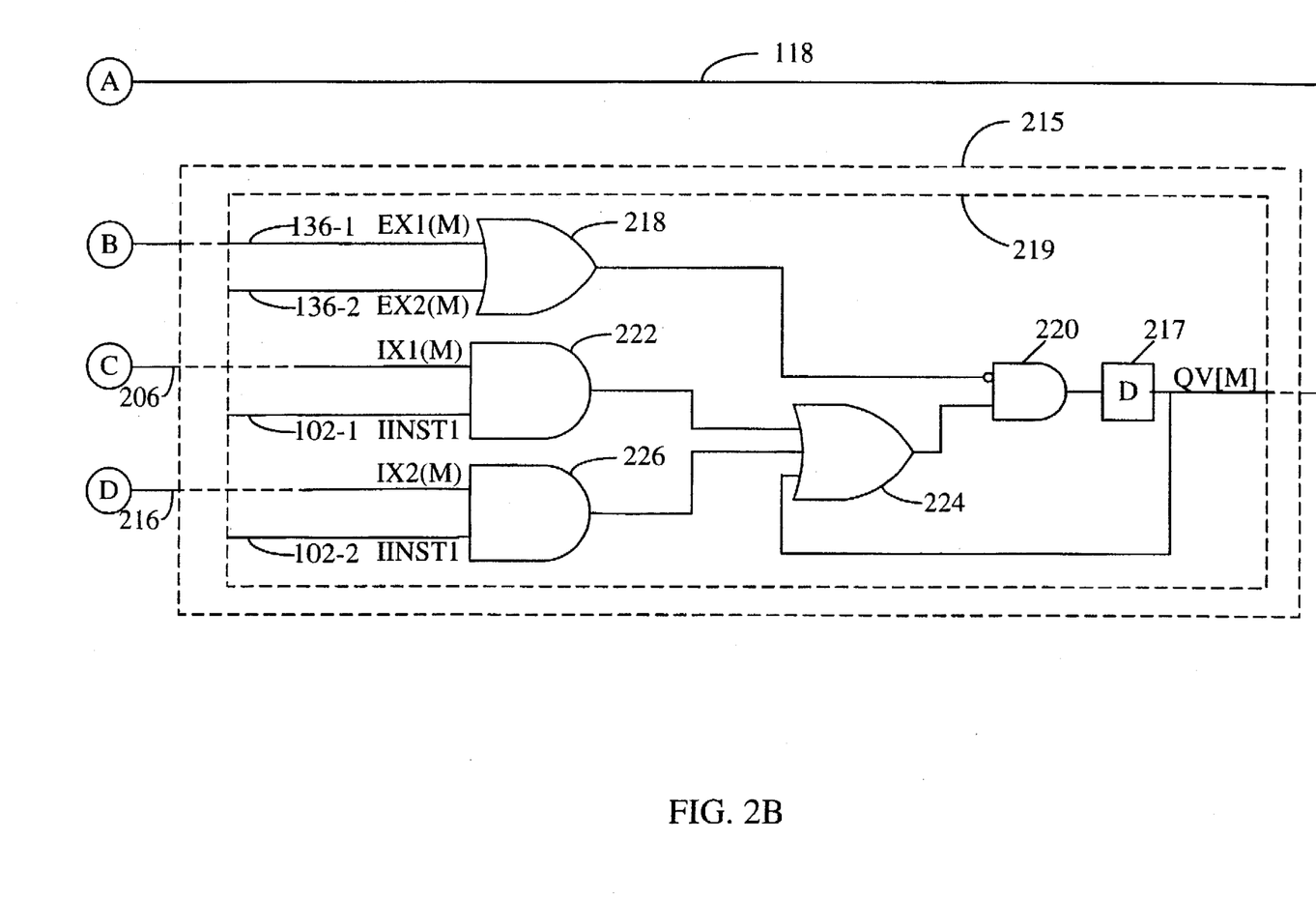

Referring to FIGS. 2a and 2b, there are shown block diagrams illustrating the instruction queue 116. The instruction queue 116 includes an instruction queue memory 260 for storing the program instructions 102 and providing the selected instructions 106 responsive to the oldest-instruction vectors 136.

The instruction queue 116 includes an empty queue indicator 201 for generating a 1-hot empty queue indicator vector 206 (IX1[0, . . . ,7]) and a 1-hot empty queue indicator vector 216 (IX2[0, . . . ,7]) indicating in which locations of the instruction queue memory 260 the instructions 106 are stored. More specifically, responsive to the inverse of the valid queue entries signal 118 (QV[0, . . . ,7]) from an inverter 202, a first priority selector 204 selects an instruction from the instruction queue memory 260 by selecting one entry of the valid queue entries signal 118 and sets a corresponding bit of the empty queue indicator vector 206 (IX1[0, . . . ,7]). A valid queue entries signal 118' (QV[7, . . . ,0]) is the valid queue entries signal 118 with the bits in the reverse order. Similarly, responsive to the inverse of the valid queue entries signal 118' (QV[7, . . . ,0]) from an inverter 208, a second priority selector 210 selects an instruction from the instruction queue memory 260 by selecting one entry of the valid queue entries signal 118 and provides a 1-hot selection signal 212 to a deselection AND gate 214 which logically ANDS the selection signal 212 and an inverse of the empty queue indicator signal 206 IX1[0, . . . ,7] to generate the empty queue indicator vector 216 (IX2[7, . . . ,0]). The priority selectors 204, 210 may select an instruction, for example, randomly or sequentially. The empty queue indicator vectors 206, 216 (IX1, IX2) are provided to the instruction queue memory 260 for indicating the location in the queue for storing the instructions 102.

A valid queue entries signal generator 215 has a plurality of valid queue entries bit generators 219 (here 8), each for generating a bit of the valid queue entries signal 118. For clarity only one generator 219 is shown. The bits of the valid queue entries signal 118 are set if the instruction is stored in the instruction queue memory 260 and the bit is cleared if the instruction is retrieved from the memory 260 for execution. A delay flip-flop 217 generates the valid queue entries signal 118 (QV(m)). An OR gate 218 provides the logic OR of the m-th element of the oldest-instruction vector 136-1 (EX1) and the m-th element of the second-oldest-instruction vector 136-2 (EX2) to an inverted input of an AND gate 220 for clearing the entry of the valid queue entries signal 118 if the corresponding instruction is selected for execution. An AND gate 222 provides a signal indicative of the logic AND of the m-th element of the empty queue indicator vector 206 and the program instruction 102-1 to a first input of an OR gate 224 for setting the entry of the valid queue entry signal 118. Similarly, an AND gate 226 provides a signal indicative of the logic AND of the m-th element of the empty queue indicator vector 216 and the program instruction 102-2 to a second input of the OR gate 224 for setting the entry of the valid queue entry signal 118. The valid queue entries signal 118 (QV(m)) from the delay flip-flop 217 is fedback to a third input of the OR gate 224 for latching the valid queue entries signal 118. The output of the OR gate 224 is provided to a second input of the AND gate 220, which provides the logic AND of the signals applied to its inputs to the delay flip-flop 217 for latching.

A sequence number generator 237 has a plurality of sequence number bit generators 239 (here 8), each for generating a bit of the instruction age signal 132. For clarity only one generator 239 is shown. The program instruction 102-1 is applied to an inverted input of an AND gate 238 and to an input of an AND gate 240. The program instruction 102-2 is applied to a second inverted input of the AND gate 238 and to an input of an AND gate 242. The outputs of the AND gates 238, 240, 242 are applied to respective inputs of an OR gate 244, which provides an output to a delay flip-flop 246. An output signal 248 of the delay flip-flop is provided to a third input of the AND gate 238, to a plus-one adder 250 (+1), and to a plus-two adder 252 (+2), and to a first input of an AND gate 253. The output signal 254 of the plus-one adder 250 is provided to a second input of the AND gate 240 and to a first input of an AND gate 256. The output of the plus-two adder 252 is provided to a second input of the AND gate 242.

A delay flip-flop 258 generates the m-th element of the instruction age signal 132 (SN(m)). An AND gate 230 provides a signal indicative of the logic AND of the m-th element of the empty queue indicator vector 206 and the output signal 248 to a first input of an OR gate 260. Similarly, the AND gate 256 provides a signal indicative of the logic AND of the m-th element of the empty queue indicator vector 216 and the output signal 254 to a second input of the OR gate 260. The empty queue indicator vector 206 and the empty queue indicator vector 216 are each applied to an inverting input of an AND gate 262. The instruction age signal 132 (SN(m)) from the delay flip-flop 258 is fedback to an input of the AND gate 262 for latching the signal 132. The output of the OR gate 260 is provided to the delay flip-flop 258.

Figure 3:
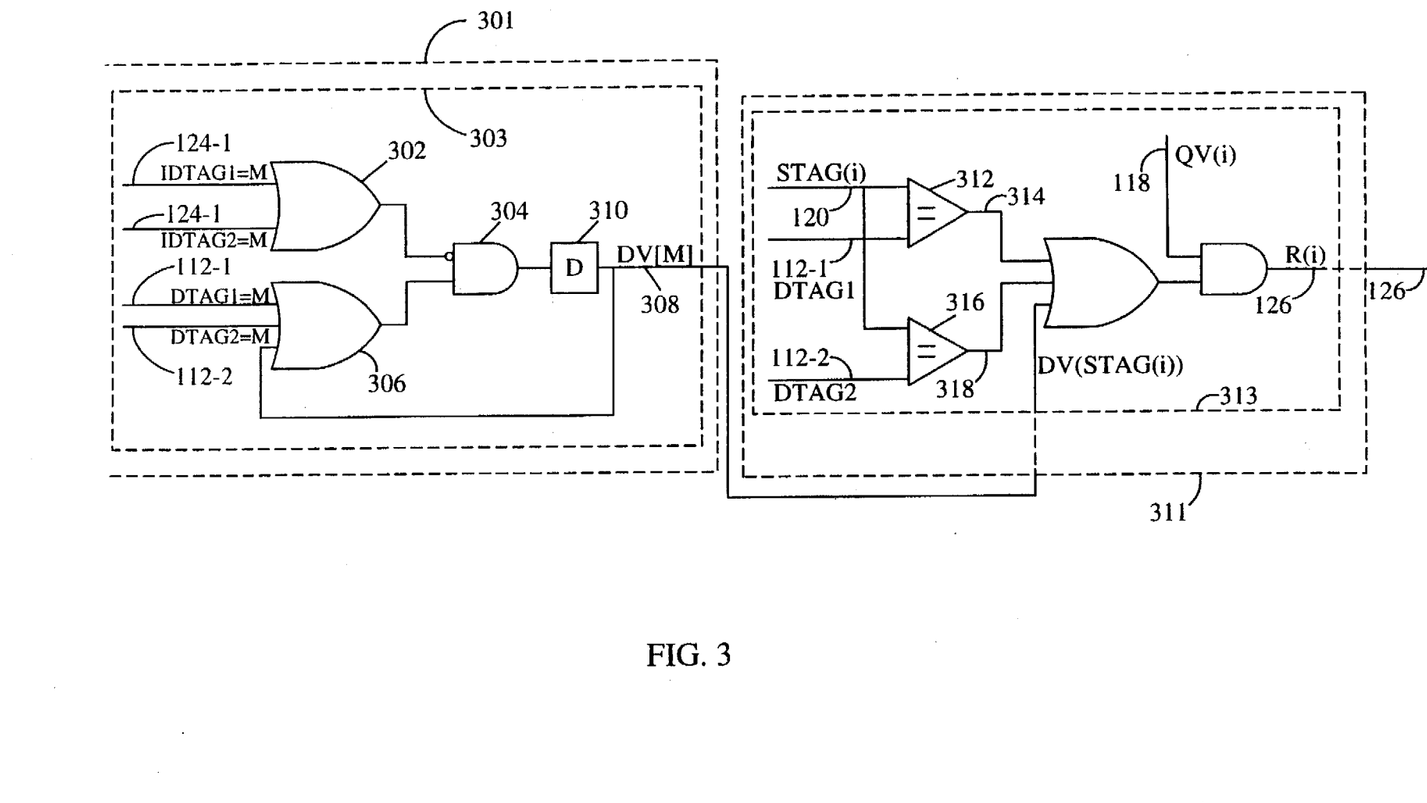
FIG. 3 is a block diagram illustrating a dependency checker of the instruction selector of FIG. 1.

Referring to FIG. 3, there is shown a block diagram illustrating a conventional dependency checker 122. A destination valid generator 301 has a plurality of destination valid bit generators 303 (here 8), for providing a destination valid signal 308 (DV[0, . . . ,7] indicative of valid registers for receiving data. Each generator 303 generates a bit of the destination valid signal 308 (DV(m)). For clarity only one generator 303 is shown. An OR gate 302 provides the logic OR of the destination register signal 124-1 (IDTAG1) for register m and the destination register signal 124-2 (IDTAG2) for register m to an inverted input of an AND gate 304 for clearing the corresponding bit of the destination valid signal 308. An OR gate 306 provides a signal indicative of the logic OR of the destination register signal 112-1 (DTAG1) for register m, the destination register signal 112-2 (DTAG2) for register m, and the destination valid signal 308 (DV(m)) to a second input of the AND gate 304 for setting the destination valid signal 308 (DV(m)). The output of the AND gate 304 is provided to a delay flip-flop 310, which generates the destination valid signal 308 (DV(m)). The destination valid signal 308 is fedback to the OR gate 306 for latching. The destination valid signal 308 is set to zero if the instruction of which the destination register is m is dispatched into the instruction queue, or in other words, IDTAG=m. The destination valid signal 308 is set to one if the execution unit 110 sends the corresponding destination register number being executed in the execution unit 110 has successfully produced the result and written it into the registers indicated by the destination register number 112 (DTAG).

If the source register of the instruction in the queue becomes newly available (STAG 120 matches DTAG 112) or the source register already became available, the instruction is ready to be executed. The eligible queue entry signal 126 indicates the instructions are ready to be executed.

An eligible queue entry generator 311 has a plurality of eligible queue entry bit generators 313 (here 8), each for generating a bit of the eligible queue entry signal 126. For clarity only one generator 313 is shown. The dependency checker 122 generates the eligible queue entry signal 126 responsive to the source register signal 120 (STAG), the destination register signals 112-1,-2, and the valid queue entries signal 118. A first comparator 312 compares the i-th element of the source register signal 120 to the first destination register signal 112-1 and generates a first match signal 314 if the signal 120 matches the signal 112-1. Similarly, a second comparator 316 compares the i-th element of the source register signal 120 to the second destination register signal 112-2 and generates a second match signal 318 if the signal 120 matches the signal 112-1. An OR gate 320 provides a match signal 319 indicative of the logic OR of the first and second match signals 314, 318 and the destination valid signal 308 for the source register for the i-th element (DV(STAG(i))). An AND gate 322 provides the eligible queue entries signal 126 [R[i]) indicative of the logic AND of the match signal 319 and the signal 118 (QV(i)). The signal 126 (R[i]) is set if there is an i-th instruction in the memory 260 and the associated registers for the instruction is available.

Figure 4:
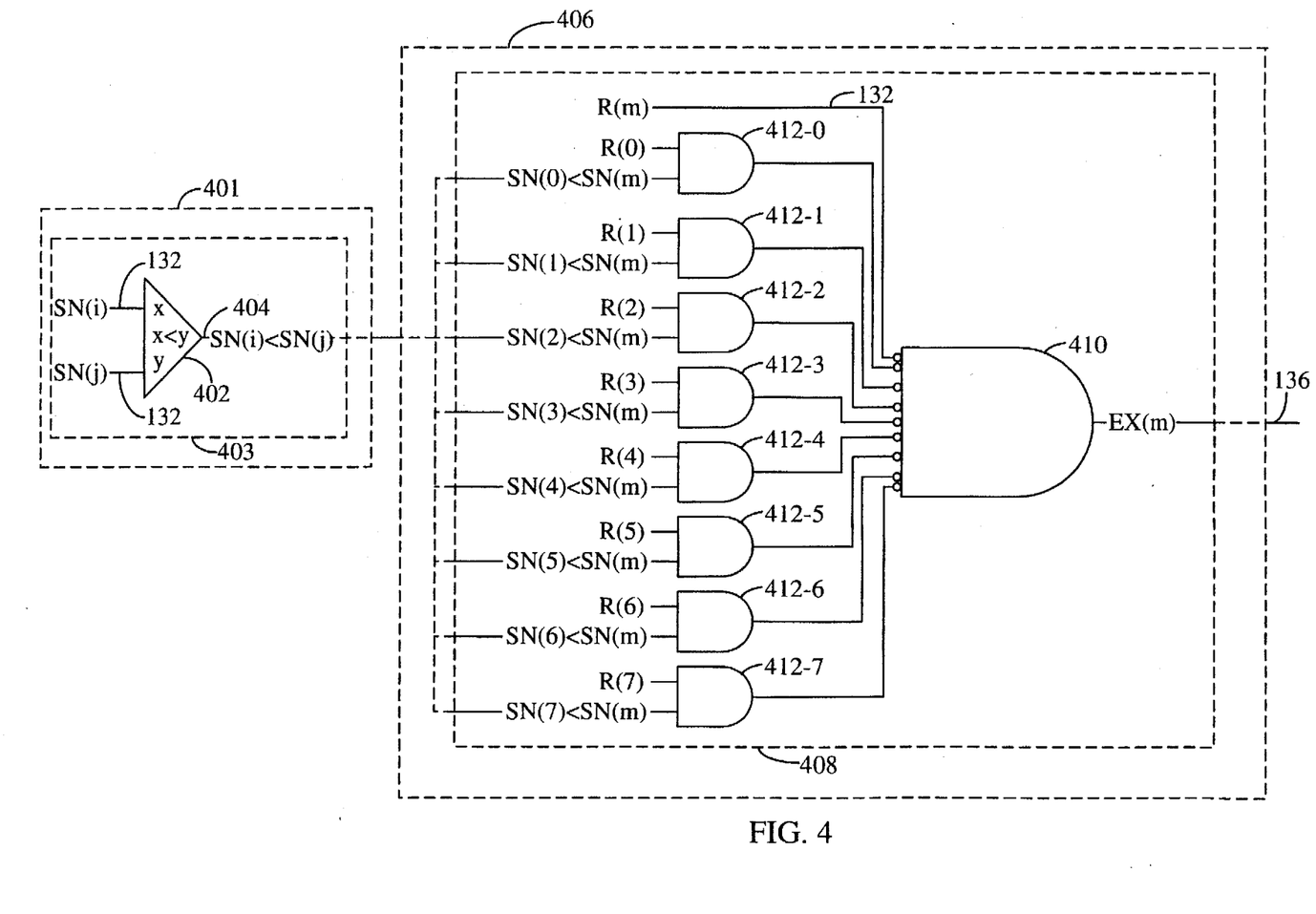
FIG. 4 is a block diagram illustrating an oldest instruction selector of the instruction selector of FIG. 1.

Referring to FIG. 4, there is shown a block diagram illustrating the oldest instruction selector. An instruction age comparator 401 has a plurality of instruction age bit comparators 403, each for generating a comparison signal 404. For clarity only one comparator 403 is shown. A comparator 402 receives two bits of the instruction age signal 132 (SN) from the instruction queue 116. Each comparator 402 of the plurality receives the two elements of the signal 132 corresponding to two instructions. For illustrative purposes, the instruction age signals SN(i) and SN(j) corresponding to instructions i and j are provided to the comparator 402. The comparator 402 compares the instruction age signal 132 SN(i) of instruction i and the instruction age signal 132 SN(j) of instruction j and provides a comparison signal 404 having a first logic state, such as a logic 1, if SN(i)<SN(j) and having a second logic state, such as a logic 0, if SN(i)≧SN(j).

An oldest instruction generator 406 has a plurality of oldest instruction bit generators 408 (here 8), each for generating a bit of the oldest-instruction vectors 136. For clarity only one selected instruction bit generator 408 is shown. The selected instruction generator 406 compares the instruction age signals 132 for instructions ready to execute as indicated by the eligible queue entry signal 126 and selects the oldest instruction. An AND gate 410 sets a bit M of the oldest-instruction vector 136 (EX[M]) if the instruction M is ready for execution and it is the oldest instruction. More specifically, bit M of the eligible queue entry signal 126 (R[M]) is applied to a first input of the AND gate 410 to enable the gate. A plurality of AND gates 412-0 through 412-7 have an output applied to a corresponding inverted input of the AND gate 410 for enabling if the instruction, M is older than another instruction or, if the instruction M is not older than the other instruction, such instruction is not ready for execution. In particular, the comparison signal 404 for comparing instruction M and instruction X is applied to a first input of the AND gate 412-X and bit X of the eligible queue entry signal 126 (R[X]) is applied to a second input of the AND gate 412-X.

Figure 5:
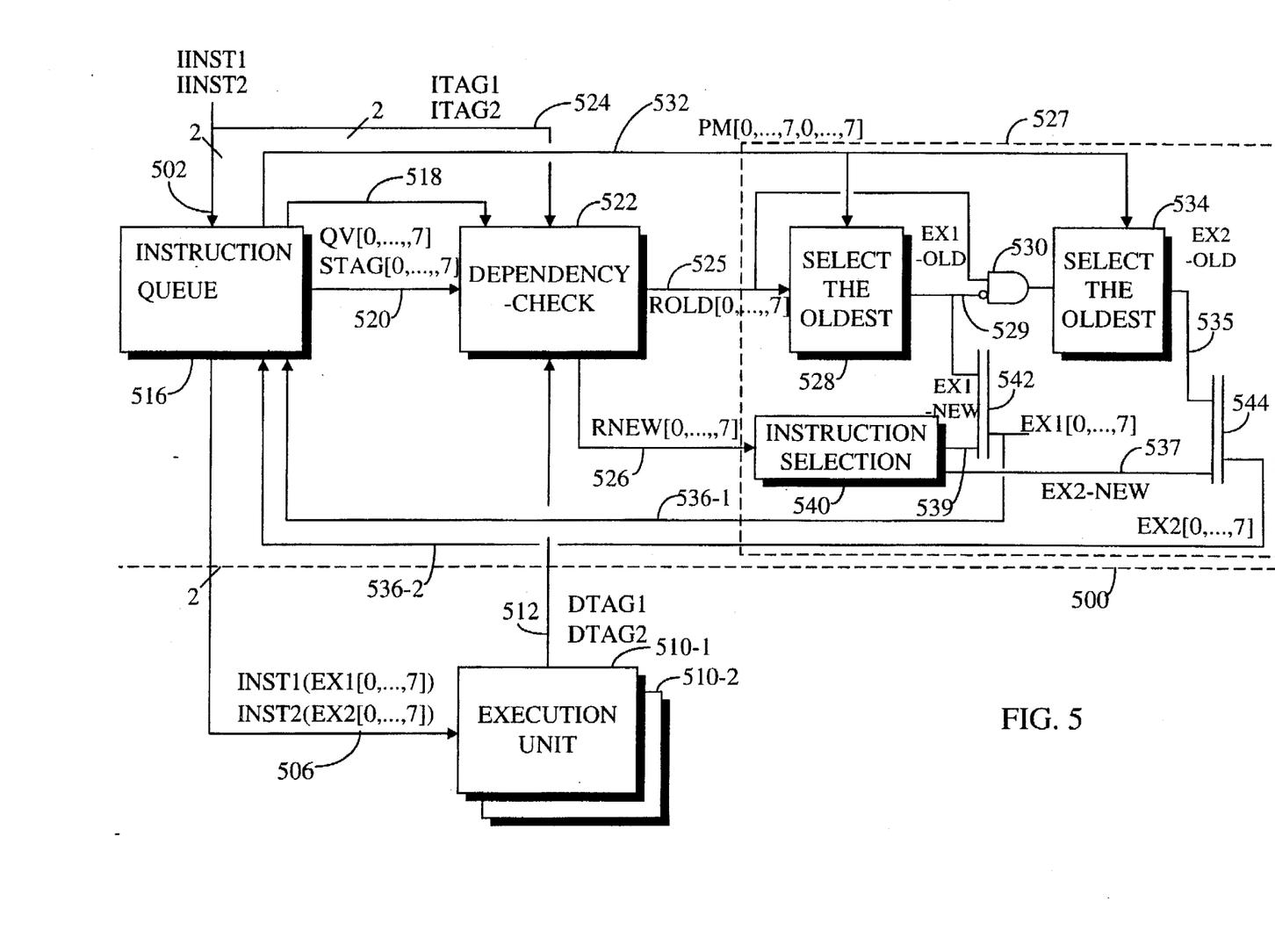
FIG. 5 is a block diagram illustrating an instruction selector in accordance with the present invention.

Referring to FIG. 5, there is shown a block diagram illustrating an instruction selector 500. The instruction selector 500 receives program instructions 502-1,-2 in program order and destination register signal 524 indicative of the number of external destination registers (not shown) of the dispatched instructions. The instruction selector 500 provides selected instructions 506-1,-2 to at least one execution unit 510 for execution. The instruction selector 500 selects the instructions as follows. For multiple execution units 510, for example N execution units, the instruction selector 500 selects N instructions. If there are M instructions that become ready during the previous cycle and M≧N, the instruction selector 500 selects the N oldest instructions from the M instructions. The instructions that become ready during the previous cycle are referred to herein as instructions got ready previous cycle. If M<N but not zero, the instruction selector 500 selects M instructions and N-M instruction from the instructions that become ready during the current cycle. The instructions that become ready during the current cycle are referred to herein as instructions get ready current cycle. For purposes of illustration, the size of the instruction queue 516 is 8 and the number of instructions to be selected is 2. The execution unit 510 includes two execution units 510-1,-2. Upon completing the execution of the program instructions 506, the execution unit, 510 provides destination register signals 512-1,-2 indicative of the destination register number of the selected instructions 506 to the corresponding execution unit 510 for updating release information.

More specifically, an instruction queue 516 receives the program instructions 502 in program order and stores the instructions therein. The instruction queue 516 provides a valid queue entry signal 518 (QV[0, . . . ,7]) and a source register signal 520 (STAG[0, . . . ,7]) corresponding to each instruction 506 and indicative of the source register numbers of the instructions in the instruction queue 516 to a dependency checker 522. The instruction queue 516 generates a precedence matrix 532 (PM[0, . . . ,7, 0, . . . ,7]) indicative of the relative ages of the instructions in the queue 516. The dependency checker 522 receives the destination register signals 512 from the execution units 510. The dependency checker 522 determines whether the source register is available and provides a multi-hot previous cycle eligible entries vector 525 (R_OLD[0, . . . ,7]) indicative of the valid entries that became ready in the previous cycle and a multi-hot current cycle eligible entries vector 526 (R_NEW[0, . . . 7]) indicative of the valid entries that get ready on the current cycle to a cascaded oldest-instruction selector 527. The cascaded oldest instruction selector 527 selects the oldest and second oldest entries from the old eligible entries using the precedence matrix 532 PM[0, . . . ,7, 0, . . . ,7] and provides a 1-hot first-selected-instruction vector 536-1 (EX1 [0, . . . ,7]) and a 1-hot second-selected-instruction vector 536-2 (EX2 [0, . . . ,7]).

The cascaded oldest-instruction selector 527 has an oldest-instruction selector 528 that receives the previous cycle eligible entries vector 525 (R_OLD[0, . . . ,7]) and the precedence matrix 532 and provides a 1-hot previous cycle oldest-instruction vector 529 (EX1_OLD[0, . . . ,7]). A deselection AND gate 530 inverts the vector 529, logically ANDS the inverted vector with the R_OLD vector 525, and provides the logical AND to a second-oldest-instruction selector 534, which generates a 1-hot previous cycle second-oldest-instruction vector 535 (EX2_OLD[0, . . . ,7]). The instruction selector 540 selects two entries from the current cycle eligible entries vector 526 (RNEW[0, . . . ,7]) and provides 1-hot oldest-instruction vector 537 (EX1_NEW[0, . . . ,7]) and a 1-hot second-oldest-instruction vector 539 (EX2_NEW [0, . . . ,7]). The instruction selector 540 selects the instructions from the eligible entries vector 526 per a predetermined selection criteria. The predetermined selection criteria may be, for example, random or sequentially. The instruction selector 540 may be, for example, a priority selector.

A first multiplexer 542 receives the previous cycle oldest-instruction vector 529 (EX1_OLD) from the first oldest instruction selector and receives the current cycle selected-instruction vector 537 (EX1_NEW) from the instruction selector 540. A second multiplexer 544 receives the previous cycle second-oldest-instruction vector 535 (EX2_OLD) from the second oldest instruction selector and receives the current cycle second-selected-instruction vector 539 (EX2_NEW) from the instruction selector 540. If the number of valid entries that got ready previous cycle is greater than 2, the first and second multiplexers 542, 544 provide the previous cycle oldest-instruction vector 529 (EX1_OLD) and the previous cycle second-oldest-instruction vector (EX2_OLD) as the first-selected-instruction vector 536-1 (EX1) and the second-selected-instruction vector 536-2 (EX2), respectively, to the instruction queue 516. If the number of valid entries got ready previous cycle is 1, the first and second multiplexers 542, 544 provide the previous cycle oldest-instruction vector 529 (EX1_OLD) and the current cycle second-selected-instruction vector 539 (EX2_NEW) as the first-selected-instruction vector 536-1 (EX1) and the second-selected-instruction vector 536-2 (EX2), respectively. If the number of valid entries that got ready previous cycle is 0, the first and second multiplexers 542, 544 provide the current cycle selected-instruction vector 537 (EX1_NEW) and current cycle second-selected-instruction vector 539 (EX2_NEW) as the first-selected-instruction vector 536-1 (EX1) and the second-selected-instruction vector 536-2 (EX2), respectively.

Responsive to the first-selected-instruction vector 536-1 (EX1) and the second-selected-instruction vector 536-2 (EX2), the instruction queue 516 outputs the corresponding instructions 506 (INST[EX1], INST[EX2]) to the execution units 510. After executing the instructions 506, the execution units 510 send the destination register numbers of the instructions (DTAG1, DTAG2) to the dependency checker 502 which updates the related information.

For the example, column 2 of the matrix 532 is cleared when the instruction in location 2 is removed such as for execution.

Figure 6A:
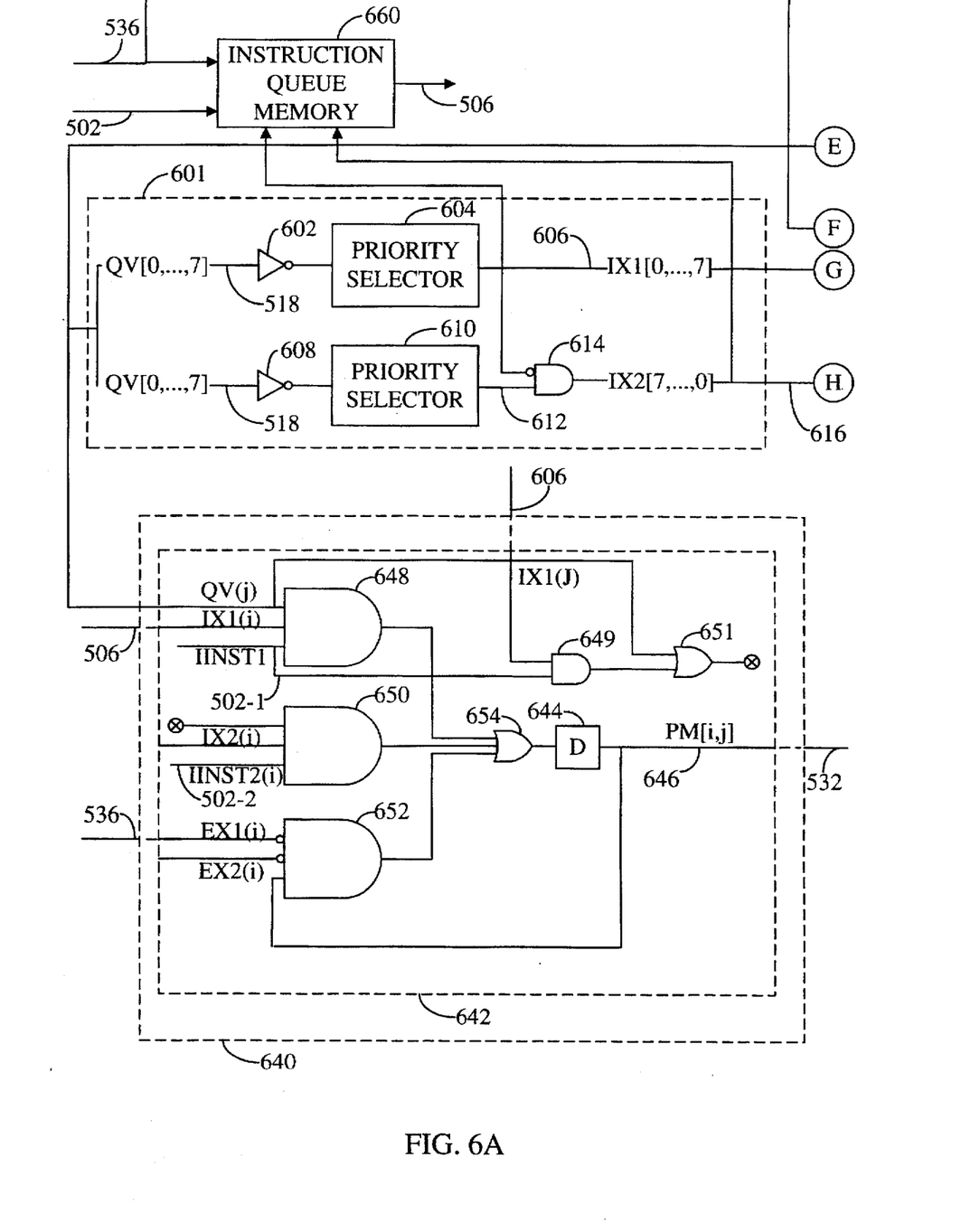
FIGS. 6a and 6b are block diagrams illustrating an instruction queue of the instruction selector of FIG. 5.
Figure 6B:
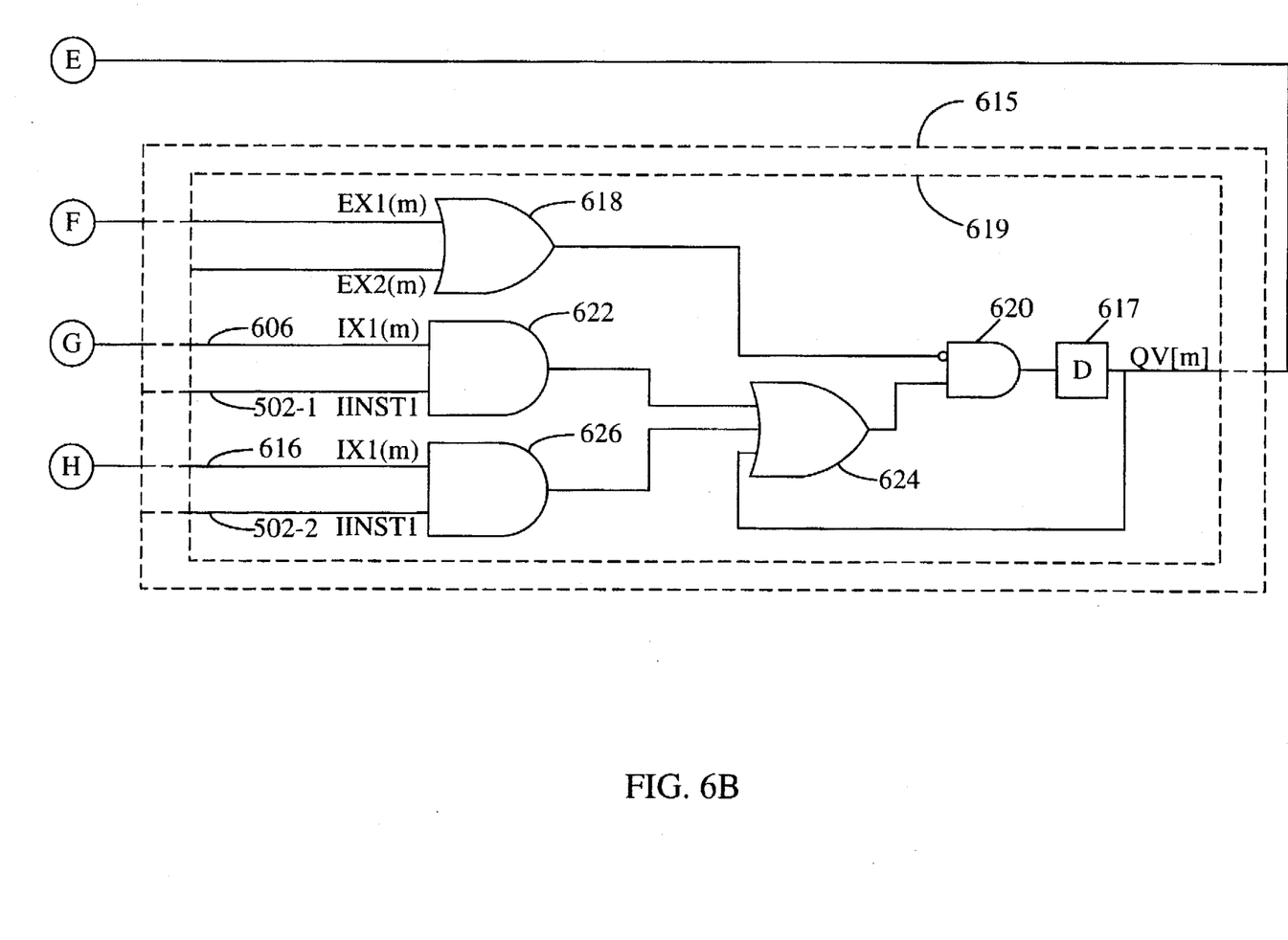

Referring to FIGS. 6a and 6b, there are shown block diagrams illustrating an instruction queue 516. The instruction queue 516 includes an instruction queue memory 660 for storing the program instructions 502 and providing the selected instructions 506 responsive to the oldest-instruction vectors 536.

The instruction queue 516 includes an empty queue indicator 601 for generating a 1-hot empty queue indicator vector 606 (IX1[0, . . . ,7]) and a 1-hot empty queue indicator vector 616 (IX2[0, . . . ,7]) indicating in which locations of the instruction queue memory 560 the instructions 506 are stored. Responsive to the inverse of the valid queue entries signal 518 (QV[0, . . . ,7]) from an inverter 602, a first priority selector 604 selects an instruction from the instruction queue memory 660 by selecting one entry of the valid queue entries signal 518 and sets a corresponding bit of the empty queue indicator vector 606 (IX1[0, . . . ,7]). A valid queue entries signal 518' (QV[7, . . . ,0]) is the valid queue entries signal 518 with the bits in the reverse order. Similarly, responsive to the inverse of the valid queue entries signal 518' (QV[7, . . . ,0]) from an inverter 608, a second priority selector 610 sets a bit corresponding to the selected instruction of a 1-hot selection signal 612. The selection signal 612 is applied to a deselection AND gate 614 which deselects the set bit of the empty queue indicator vector 606 from the selection signal 612 to generate the empty queue indicator vector 616 (IX2[7, . . . ,0]). The priority selectors 604, 610 may select an instruction, for example, randomly or sequentially. The empty queue indicator vectors 606, 616 (IX1, IX2) are provided to the instruction queue memory 660 for indicating the location in the queue for storing the instructions 502.

A valid queue entries signal generator 615 has a plurality of valid queue entries bit generators 619 (here 8), each for generating a bit of the valid queue entries signal 518. For clarity only one generator 619 is shown. The bits of the valid queue entries signal 518 are set if the instruction is stored in the instruction queue memory 660 and is cleared if the instruction is retrieved from the memory 660 for execution. A delay flip-flop 617 generates the valid queue entries signal 518 (QV(m)). An OR gate 618 provides the logic OR of the m-th element of the first-selected-instruction vector 536-1 (EX1) and the m-th element of the second-selected-instruction vector 536-2 (EX2) to an inverted input of an AND gate 620 for clearing the entry of the valid queue entries signal 518 if the corresponding instruction is selected for execution. An AND gate 622 provides a signal indicative of the logic AND of the m-th element of the empty queue indicator vector 606 and the program instruction 502-1 to a first input of an OR gate 624 for setting the entry of the valid queue entry signal 518. Similarly, an AND gate 626 provides a signal indicative of the logic AND of the m-th element of the empty queue indicator vector 616 and the program instruction 502-2 to a second input of the OR gate 624 for setting the entry of the valid queue entry signal 518. The valid queue entries signal 518 (QV(m)) from the delay flip-flop 617 is fedback to a third input of the OR gate 624 for latching the valid queue entries signal 518. The output of the OR gate 624 is provided to a second input of the AND gate 620, which provides the logic AND of the signals applied to its inputs to the delay flip-flop 617 for latching.

The precedence matrix 532 is generated by updating the valid queue entry signal 518 (QV[0, . . . ,7]) upon receipt of an instruction and loading the bits of the signal 518 into the row of the precedence matrix 532 corresponding to the entry in the instruction queue memory 660. For example if the instruction is stored in location 2 of the memory 660, row 2 of the precedence matrix 532 is replaced by the signal 518. The column of the matrix 532 corresponding to an instruction removed from the instruction queue memory 660 is cleared.

A precedence matrix generator 640 for generating the precedence matrix 532 comprises an N×N array of element generators 642, each element generator 642 generates an element PM (i,j) of the precedence matrix 532. For clarity, only one element generator 642 is shown. The element PM[i,j] indicates which instruction in the entry j is older than the instruction in entry i. PM[i,j] is set to one if an instruction newly assigned to the instruction queue entry i and entry j is valid (i.e. entry j is older then entry i). The element PM(i,j) is set to zero if either the instruction newly assigned to the instruction queue entry i and entry j is empty (i.e. entry j is younger than entry i) or an instruction in the entry j in the instruction queue memory 660 is removed and entry j becomes empty. The element PM[i,j,] is set to one if either (1) the empty queue indicator vector 606 (IX1[0, . . . ,7]) equals i and the valid queue entries signal 518 (QV[j]) equals 1 (is set) or (2) the empty queue indicator vector 616 (IX2[0, . . . ,7]) equals i and either the valid queue entries signal 518 (QV[j]) equals 1 or the empty queue indicator vector 606 (IX1[0, . . . ,7]) equals j. The element PM[i,j] is set to zero if either (1) the empty queue indicator vector 606 equals i and the valid queue entries signal 518 (QV[j]) equals zero, (2) the empty queue indicator vector 616 (IX2[0, . . . ,7]) equals i and the valid queue entries signal 518 (QV[j]) does not equal 1 and the empty queue indicator vector 606 (IX1[0, . . . ,7]) does not equal j, (3) the first-selected-instruction vector 536-1 (EX1[0, . . . ,7]) equals i, or (4) the second-selected-instruction vector 536-2 (EX2[0, . . . ,7]) equals i.

A delay flip-flop 644 provides a signal 646 for the element PM(i,j) of the precedence matrix 532. An AND gate 648 receives at a corresponding input the j-th element of the valid queue entries signal 518 (QV[j]), the empty queue indicator vector 606 (IX1[j]), and the program instruction 502-1 (IINST1) and sets the precedence if all inputs are set. An AND gate 649 receives the j-th element of the empty queue indicator vector 606 (IX1[j]) and the program instruction 502-1 (IINST1) and applies its output to a first input of an OR gate 651. The j-th element of the valid queue entries signal 518 (QV[j]) is applied to the second input of the OR gate 651. The output of the OR gate 651 indicates whether either the valid queue entries signal 518 (QV[j]) is set or the empty queue indicator vector 606 (IX1 [0, . . . ,7]) equals j. An AND gate 650 receives at a corresponding input the j-th element of the valid queue entries signal 518 (QV[j]), the empty queue indicator vector 616 (IX2[j]), and the program instruction 502-2 (IINST2), and the output of the OR gate 651 and sets the precedence if all inputs are set. An AND gate 652 latches the element PM[i,j] of the precedence matrix 532, applied to the AND gate 652, if the inverse of first-selected-instruction vector 536-1 (EX1[i]) and the inverse of the second-selected-instruction vector 536-2 (EX2[i]) applied thereto are set. An OR gate 654 receives the outputs of the AND gates 648, 650, 652 for setting the element PM[i,j] 646 and provides an output to the delay flip-flop 644 for latching.

Figure 7:
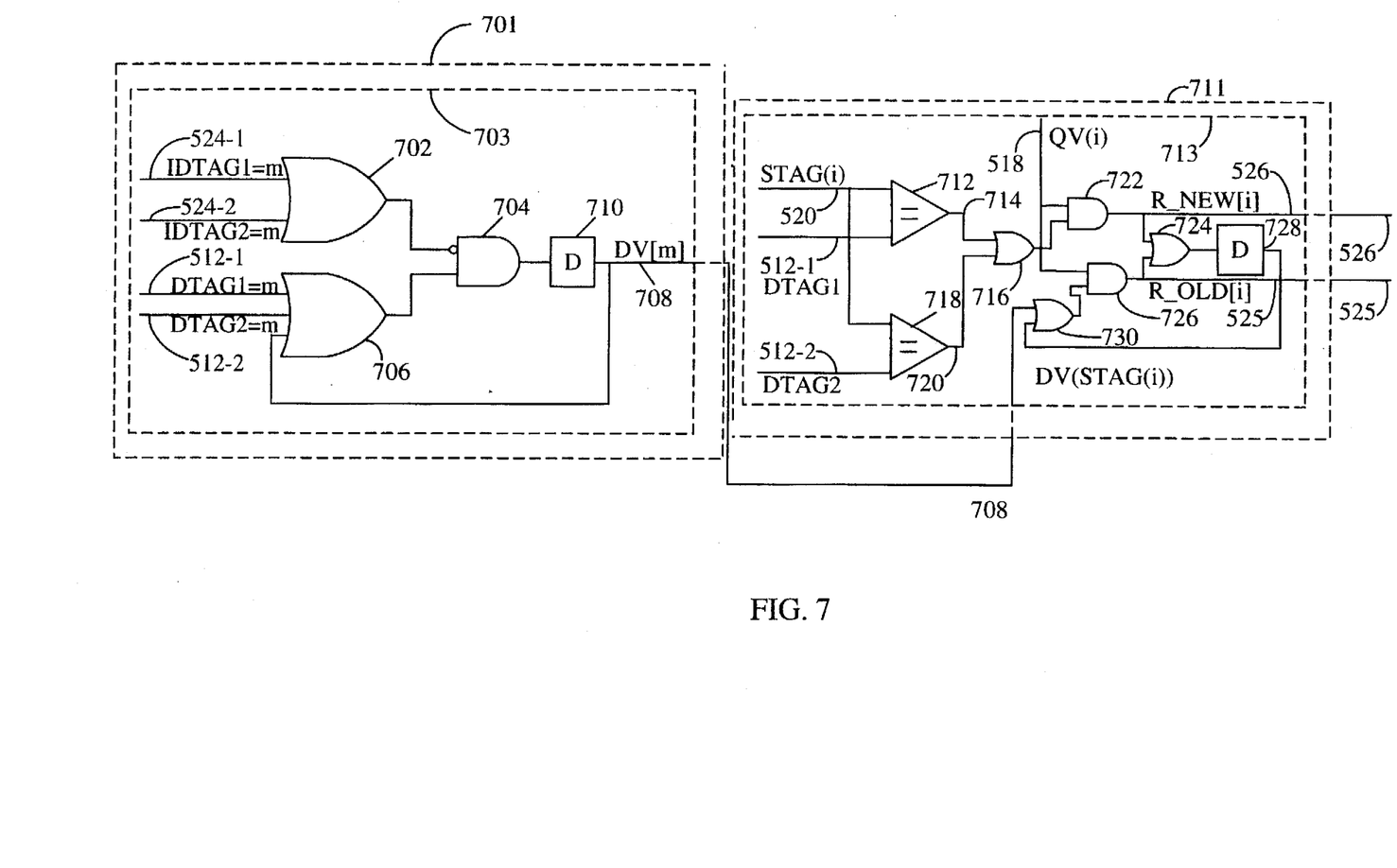
FIG. 7 is a block diagram illustrating a dependency checker of the instruction selector of FIG. 5.

Referring to FIG. 7, there is shown a block diagram illustrating the dependency checker 522. The dependency checker 522 generates the previous cycle eligible entries vector 525 (ROLD[0, . . . ,7]) and the current cycle eligible entries vector 526 (RNEW[0, . . . 7]) responsive to the source register signal 520 (STAG), the destination register signals 112, and the valid queue entries signal 119. A destination valid generator 701 has a plurality of destination valid bit generators 703 (here 8) for providing a destination valid signal 708 (DV[0, . . . ,7]) indicative of valid registers for receiving data. Each generator 703 generates a bit of the destruction valid signal 708 (DV[m]). For clarity only one generator 708 is shown. An OR gate 702 provides the logic OR of the destination register signal 124-1 (IDTAG1) for register m and the destination register signal 124-2 (IDTAG2) for register m to an inverted input of an AND gate 704 for clearing the corresponding bit of the destination valid signal 708 (DV[m]). An OR gate 706 provides a signal indicative of the logic OR of the destination register signal 112-1 (DTAG1) for register m, the destination register signal 112-2 (DTAG2) for register m, and the destination valid signal 708 (DV(m)) to a second input of the AND gate 704 for setting the destination valid signal 708 (DV[m]). The output of the AND gate 704 is provided to a delay flip-flop 710, which generates the destination valid signal 708 (DV (m)). The destination valid signal 708 is fedback to the OR gate 706 for latching. The destination valid signal 708 is set to zero if the instruction of which the destination register is m is dispatched into the instruction queue, or in other words, IDTAG=m. The destination valid signal 708 is set to one if the execution unit 510 sends the corresponding destination register number being executed in the execution unit 510 has successfully produced the result and written it into the registers indicated by the destination register number (DTAG 512).

If the source register of the instruction in the queue becomes newly available (STAG 520 matches DTAG 512) or the source register already became available, the instruction is ready to be executed. The eligible queue entry signals 525, 526 indicate that the instructions are ready to be executed.

An eligible queue entry generator 711 has a plurality of eligible queue entry bit generators 713 (here 8), each for generating a bit for both the previous cycle eligible queue entry signal 525 and the current cycle eligible queue entry signal 526. For clarity only one generator 713 is shown. A first comparator 712 compares the i-th element of the source register signal 520 to the first destination register signal 512-1 and provides a match signal 714 to a first input of an OR gate 716 if the signal matches the signal. Similarly, a second comparator 718 compares the i-th element of the source register signal 520 to the second destination register signal 512-2 and provides a match signal 720 to a second input of the OR gate 716 if the signal matches the signal. An AND gate 722 receives the output of the OR gate 716 and the valid queue entries signal 518 (QV[i]) and generates the current cycle eligible queue entry signal 526 (RNEW[i]), which is applied to a first input of an OR gate 724. An AND gate 726 provides the pervious cycle eligible queue entry signal 525 to a second input of the gate 724. The output of the OR gate 724 is applied to a delay flip-flop 728 for clocking and whose output is fedback to a first input of an OR gate 730 for latching. The destination valid signal 708 (DV[STAG(i)]) is applied to a second input of the OR gate 730 to indicate the corresponding register is available. The output of the OR gate 730 is provided to a first input of an AND gate 726. The valid queue entries signal 518 is applied to a second input of the AND gate 726 to set the corresponding bit of the previous cycle eligible queue entry signal 525 if the register is available.

Figure 8:
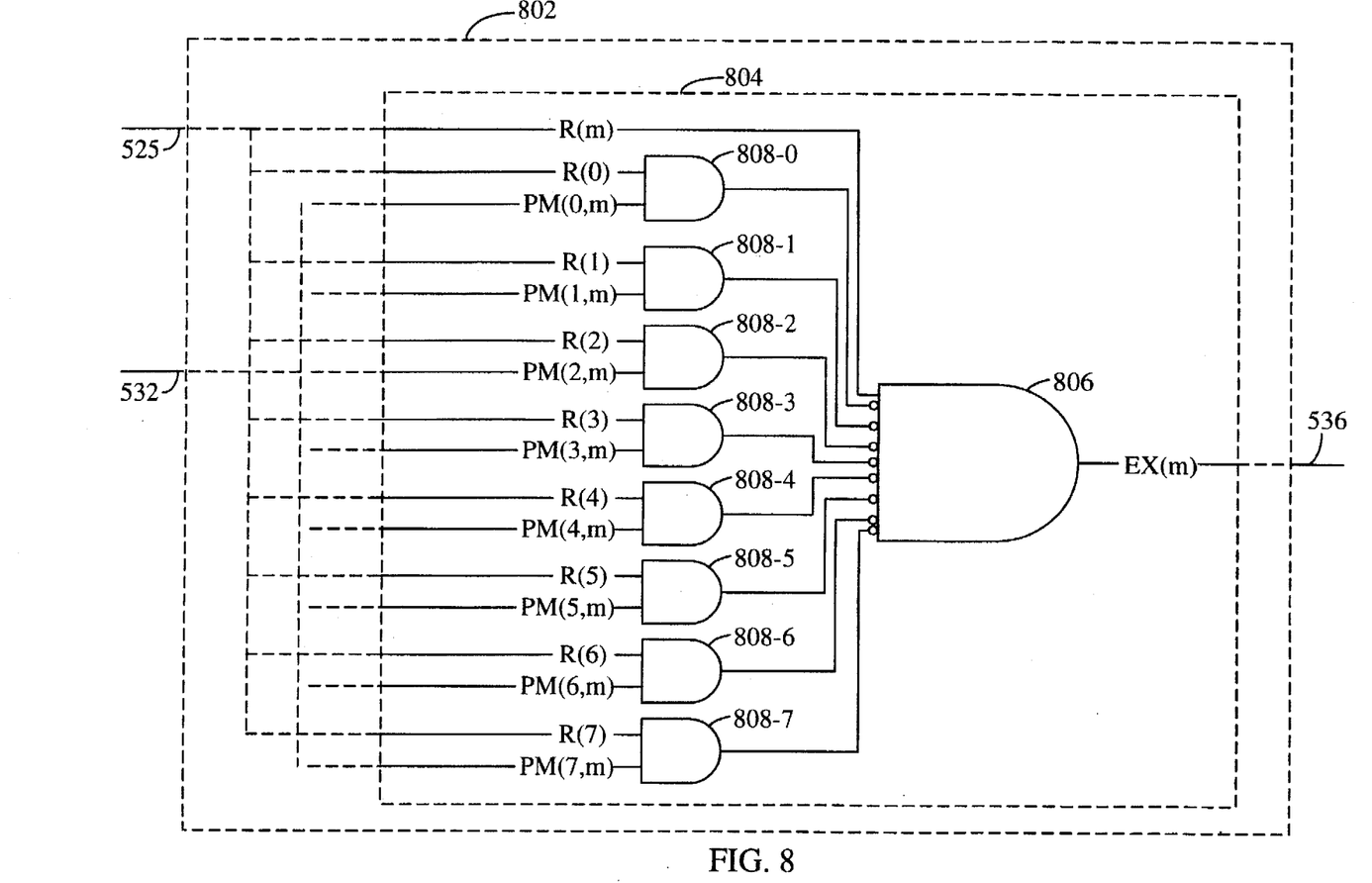
FIG. 8 is a block diagram illustrating an oldest instruction selector of the instruction selector of FIG. 5.

Referring to FIG. 8, there is shown a block diagram illustrating the oldest-instruction selectors 528,534. An instruction age comparator 702 has a plurality of instruction age bit comparators 804, each for generating a bit of the selected-instruction vectors 536. For clarity only one comparator 804 is shown. The oldest-instruction selector 528 selects the oldest instruction ready to execute from the previous cycle eligible entries vector 525 (ROLD [0, . . . ,N−1]) using the precedence matrix 532 PM(i,j) to generate the elements of the first-selected-instruction vector 536-1 (EX1) and of the second-selected instruction-vector 536-2 (EX2) according to the following equation $$EX(i)=R(i) \ \& \ \sim(\text{logic OR of } (PM(i,j) \ \& \ R(j)) \text{ for all } j). \quad (1)$$

In a logically equivalent implementation, an AND gate 708 sets a bit m of the selected-instruction vector 536. (EX[m]) if the instruction m is ready for execution and it is the oldest instruction. More specifically, bit m of the previous cycle eligible queue entry signal 525 (R[m]) is applied to a first input of the AND gate 708 to enable the gate. A plurality of AND gates 808-0 through 808-7 have an output applied to a corresponding inverted input of the AND gate 806 for enabling if the instruction m is older than another instruction or if the instruction m is not older than the other instruction, such instruction is not ready for execution. In particular, the element P[x,m] of the precedence matrix 532 is applied to a first input of the AND gate 808-x and bit x of the previous cycle eligible queue entry signal 525 (R[x]) is applied to a second input of the AND gate 808-x.

Figure 9:
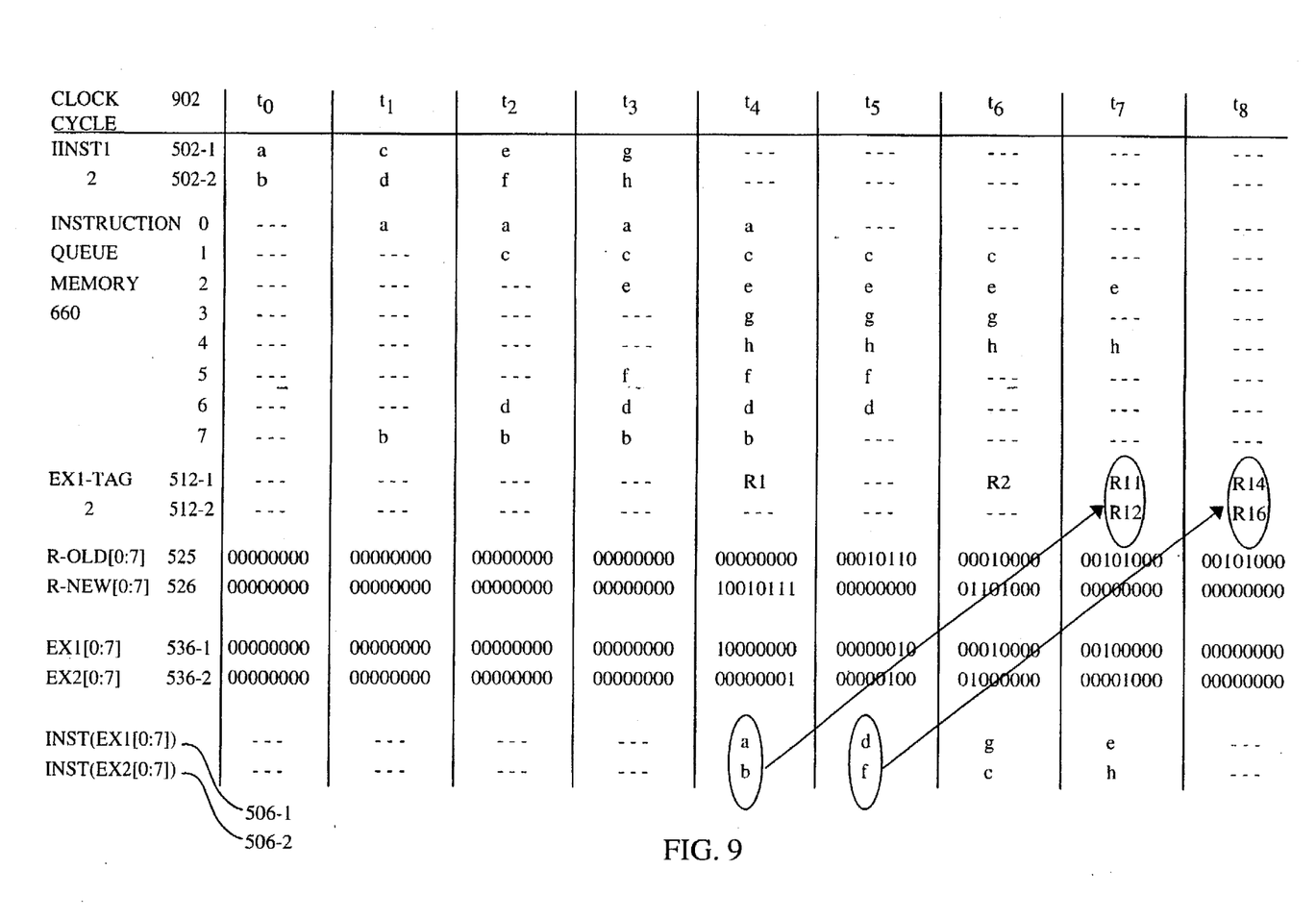
FIG. 9 is a timing diagram illustrating the timing of the instruction selector.

Referring to FIG. 9, there is shown a timing diagram illustrating the timing of the instruction selector 510. Nine clock cycles 902 are labeled as clock cycles to $t_0$ through $t_8$. Table I shows an example of a sequence of instructions 502 in a program. The instruction selector receives two instructions per clock cycle. For this example, the instructions add a number to the contents of either register R1 or R2 and store the result in another register, here registers R11 through R18.

During clock cycle $t_0$, the instruction queue 516 receives instructions a, b. For illustrative purposes the instruction queue memory 660 is assumed to be empty. It is also assumed that no bits of the previous cycle eligible entries vector 525 or of the current cycle eligible entries vector 526 are set, because registers R1 or R2 are not available. Because there are no instructions to be executed, the selected-instruction vectors 536 have all bits set to zero.

During clock cycle $t_1$, instructions a and b are loaded into the instruction queue memory 660 at locations 0 and 7, respectively. The instruction queue 516 receives instructions c, d. The current cycle entries vector 526 from the previous cycle $t_0$ becomes the previous cycle eligible entries vector 525 for cycle $t_1$. No instruction is selected because the eligible entries vectors 525, 526 have no set bits.

During clock cycle $t_2$, instructions c, d are loaded into the instruction queue memory 660 at locations 1 and 6, respectively. The instruction queue 516 receives instructions e, f. The eligible entries vectors 525, 526 and the selected-instruction vectors 536 remain unset.

During clock cycle $t_3$, instructions e, f are loaded into the instruction queue memory 660 at locations 2 and 5, respectively. The instruction queue 516 receives instructions g, h. The eligible entries vectors 525, 526 and the selected-instruction vectors 536 remain unset.

During clock cycle $t_4$, instructions g, h are loaded into the instruction queue memory 660 at locations 3 and 6, respectively. No further instructions are received. It is now assumed that the execution unit 510 has completed an instruction using register R1. Accordingly, the current cycle eligible entries vector 526 has bits 0, 3, 5, 6, 7 set corresponding to instructions a, g, f, d, s which require register R1. The oldest-instruction selector 527 selects instructions a, b as the oldest and second oldest instructions and sets bit 0 of the first-selected-instruction vector 536-1 and bit 7 of the second-selected-instruction vector 536-2 using, for this example, a selection criteria for the instruction selector 540 that selects instructions in the same order that instructions are loaded into the queue. The instruction queue 516 provides instructions a, b as selected instructions 506-1,-2, respectively, to the execution unit 510 for execution.

During the clock cycle $t_5$, the pervious cycle eligible entries vector 525 has bits 3, 5, 6 set from the current cycle eligible entries vector 526 from the previous cycle $t_4$, with bit 0, 7 not set because the instructions corresponding to these bits were sent to the execution unit 510 for execution and were removed from the instruction queue memory 660. The oldest-instruction selector 537 selects instructions d, f as the oldest and second-oldest instructions that can be executed because only register R1 is available. Only bits corresponding to register R1 are set in the eligible entry vectors 525, 526. The oldest-instruction selector 527 sets bit 6 of the first-selected-instruction vector 536-1 and bit 5 of the second-selected-instruction vector 536-2. The instruction queue 516 provides instructions d, f as selected instructions 506-1,-2, respectively.

During clock cycle $t_6$, it is now assumed that the execution unit 510 has completed an instruction using register R2. Accordingly, the current cycle eligible entries vector 526 has bits 1, 2, 4 set corresponding to instructions c, e, h which require register R2. The previous cycle eligible entries vector 525 has bit 3 set from the current cycle eligible entries vector 526 from the previous cycle $t_5$ with bits 5, 6 not set because the instructions corresponding to these bits were sent to the execution unit 510 for execution and were removed from the instruction queue memory 660. The oldest-instruction selector 527 sets bit 3 of the first-selected-instruction vector 536-1 and bit 1 of the second-selected-instruction vector 536-2. The instruction queue 516 provides instructions g, c as selected instructions 506-1,-2 respectively. Instruction g is selected first because the oldest-instruction selector 527 selects instructions from the previous cycle eligible entries vector 525 before selecting instructions from the current cycle eligible entries vector 526.

During clock cycle $t_7$, it now assumed that the execution unit 510 has completed instructions a, b using registers R11, R12. No bits are set of the current cycle eligible entries vector 526 because no instructions in the instruction queue require these registers. The previous cycle eligible entries vector 525 has bits 2 and 4 set from the current cycle eligible entries vector 526 from the previous cycle $t_6$ with bit 1 not set because instruction c corresponding to this bit was sent to the execution unit 510 for execution and was removed from the instruction queue memory 660. The oldest-instruction selector 527 sets bit 2 of the first-selected-instruction vector 536-1 and bit 4 of the second-selected-instruction vector 536-2. The instruction queue 516 provides instructions e, h as selected instructions 506-1,-2 respectively.

During clock cycle $t_8$, it now assumed that the execution unit 510 has completed instructions d, f using registers R14, R16. No bits are set of the current cycle eligible entries vector 526 because no instructions in the queue require these registers. The previous cycle eligible entries vector 525 has no bits from the current cycle eligible entries vector 526 from the previous cycle $t_7$ because bits 2, 4 are not set because the instructions e, h corresponding to these bits were sent to the execution unit 510 for execution in the previous cycle and were removed from the instruction queue memory 660. Neither the oldest-instruction selector 527 nor the second-oldest-instruction selector 534 set the respective selected-instruction vectors 536 because the instruction queue 516 has no further instructions for execution.

In summary, the instruction selector 500 selects two oldest instructions using a precedence matrix so that such selection may be done in parallel using the eligible entries vectors 525, 526. The oldest-instruction selectors 528 select the oldest instructions from the previous cycle eligible entries vectors 525. The oldest-instruction selectors 534 select the instructions from the current cycle eligible entries vectors 526 according to a predetermined selection criteria. The oldest instructions from the previous cycle are processed first.

TABLE I

| Instruction number | Instruction |
| --- | --- |
| a | R1 + 2 → R11 |
| b | R1 + 3 → R12 |
| c | R2 + 1 → R13 |
| d | R1 + 4 → R14 |

TABLE I-continued

| Instruction number | Instruction |
| --- | --- |
| e | R2 + 7 → R15 |
| f | R1 + 6 → R16 |
| g | R1 + 4 → R17 |
| h | R1 + 5 → R18 |

We claim:

1. A method for selecting the two oldest instructions from a plurality of instructions waiting to be executed, each of the plurality of instructions indicating at least one register, the method comprising the steps of:

receiving a plurality of instructions;

setting bits of a first eligible instructions vector, each bit of the first eligible instructions vector being indicative of a corresponding one of the received plurality of instructions that have said indicated registers available for such execution;

setting bits of a second eligible instructions vector, each bit being indicative of a corresponding one of the plurality of instructions waiting to be executed that have said indicated registers available for such execution;

if one of said bits of the second eligible instructions vector is set, selecting a first oldest instruction from said ones of the plurality of instructions waiting to be executed corresponding to said set bits of the second eligible instructions vector;

if one of said bits of the second eligible instructions vector is not set, selecting a first oldest instruction from said received instructions;

resetting the bit of the eligible instructions vector corresponding to the first oldest instruction;

if one of said bits of the second eligible instructions vector is set, selecting a second oldest instruction from said ones of the plurality of instructions waiting to be executed corresponding to said set bits of the eligible instructions vector;

if one of said bits of the second eligible instructions is not set, selecting a second oldest instruction from said received instructions; and resetting the bit of the eligible instructions vector corresponding to the second oldest instruction.

2. A method for selecting two oldest instructions from a plurality of instructions waiting to be executed, each of the plurality of instructions indicating at least one register, the method comprising the steps of:

setting bits of an eligible instructions vector, each bit being indicative of a corresponding one of the plurality of instructions waiting to be executed that have said indicated registers available for such execution;

selecting a first oldest instruction from said ones of the plurality of instructions waiting to be executed corresponding to said set bits of the eligible instructions vector;

resetting the bit of the eligible instructions vector corresponding to the first oldest instruction;

selecting a second oldest instruction from said ones of the plurality of instructions waiting to be executed corresponding to said set bits of the eligible instructions vector; and resetting the bit of the eligible instructions vector corresponding to the second oldest instruction.

3. An instruction selector for selecting M oldest instructions from N instructions, each of the N instructions indicating registers for executing such instructions, the instruction selector comprising:

a dependency checker for detecting the availability of the registers for executing the N instructions and for providing a signal indicative of the ones of the N instructions that may be executed responsive either to such availability or to a selected instruction signal indicative of the M oldest instructions;

an instruction queue coupled to the dependency checker for providing a signal indicative of age of each of the N instructions, for receiving and storing the N instructions, and for providing the selected M oldest instructions responsive to a selected instruction signal indicative of the M oldest instructions;

a precedence matrix generator coupled to the dependency checker and the instruction queue for generating a signal indicative of a precedence matrix indicative of the relative ages of instructions in the instruction queue;

a cascaded oldest-instruction selector coupled to the dependency checker, the instruction queue, and the precedence matrix generator, for generating the selected instruction signal responsive to the signal indicative of the ones of the N instructions that may be executed and to the signal indicative of the precedence matrix.

4. An instruction selector for selecting two oldest instructions from N instructions, each of the N instructions indicating registers for executing such instructions, the instruction selector comprising:

a dependency checker for detecting the availability of the registers for executing the N instructions and for providing a signal indicative of the ones of the N instructions that may be executed responsive either to such availability or to a selected instruction signal indicative of the two oldest instructions;

an instruction queue coupled to the dependency checker for providing a signal indicative of age of each of the N instructions, for receiving and storing the N instructions, and for providing the selected two oldest instructions responsive to a selected instruction signal indicative of the two oldest instructions; and an oldest-instruction selector coupled to the dependency checker and to the instruction queue, for generating the selected instruction signal responsive to the signal indicative of the ones of the N instructions that may be executed and to the signal indicative of age.

5. The instruction selector of claim 4 wherein the oldest-instruction selector comprises:

a first oldest instruction selector for determining the oldest instruction of said ones of the N instructions that may be executed responsive both to the signal indicative of the ones of the N instructions that may be executed and to the signal indicative of age, for generating a first oldest-instruction signal responsive to the determined oldest instruction, and for modifying the signal indicative of the ones of the N instructions that may be executed to delete said determined oldest instruction from said ones of the N instructions that may be executed; and a second oldest instruction selector for determining the oldest instruction of the ones of the N instructions that may be executed responsive both to the modified signal indicative of the ones of the N instructions that may be executed and to the signal indicative of age, for generating a second oldest-instruction signal responsive to such determined oldest instruction;

wherein the selected instruction signal is indicative of the first and second oldest-instruction signals.

* * * * *